United States Patent
Pan et al.

(10) Patent No.: US 11,016,280 B1
(45) Date of Patent: May 25, 2021

(54) OPTICAL TRAPPING OF AIRBORNE PARTICLES USING DUAL COUNTER-PROPAGATING HOLLOW CONICAL BEAMS

(71) Applicant: U.S. Army Combat Capabilities Development Command, Army Research Laboratory, Adelphi, MD (US)

(72) Inventors: Yongle Pan, Ellicott City, MD (US); Aimable Kalume, Adelphi, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/814,061

(22) Filed: Mar. 10, 2020

(51) Int. Cl.
  *G02B 21/32* (2006.01)
  *G01N 15/14* (2006.01)
  *G02B 17/08* (2006.01)
  *G02B 21/26* (2006.01)

(52) U.S. Cl.
  CPC ......... *G02B 21/32* (2013.01); *G01N 15/1434* (2013.01); *G01N 15/1484* (2013.01); *G02B 17/0868* (2013.01); *G02B 21/26* (2013.01); *G01N 2015/1493* (2013.01); *G01N 2015/1497* (2013.01)

(58) Field of Classification Search
  CPC ......... G02B 21/32; G01N 21/65; G21K 1/006
  See application file for complete search history.

(56) References Cited

U.S. PATENT DOCUMENTS

| | | | |
|---|---|---|---|
| 6,947,134 B2 | 9/2005 | Chang et al. | |
| 7,410,063 B1 | 8/2008 | Chang et al. | |
| 9,222,874 B2 | 12/2015 | Hill et al. | |
| 9,443,631 B1 | 9/2016 | Pan et al. | |
| 9,448,155 B2 | 9/2016 | Pan | |
| 2016/0260513 A1* | 9/2016 | Pan | H05H 3/04 |

OTHER PUBLICATIONS

Fabrice Merenda, "Miniaturized high-NA focusing-mirror multiple optical tweezers", Optics Express May 14, 2007 (Year: 2007).*
Kampmann, "Optical system fortrapping particles in air", Applied Optics, Jan. 31, 2014 (Year: 2014).*

(Continued)

*Primary Examiner* — Maurice C Smith
(74) *Attorney, Agent, or Firm* — Eric B. Compton

(57) ABSTRACT

Embodiments of the present invention are directed to systems and methods for trapping and holding airborne particles, for further measurement and characterization. In the various embodiments, an optical trap is provided which generates and uses dual hollow conical beams to trap and hold absorbing and non-absorbing, spherical and irregularly shaped, liquid and solid airborne particles. The optical trap may include: a light source for generating a beam of light; optics for shaping and forming a hollow conical beam having a ring geometry from the beam of light; a trapping region where a particle can be present to be trapped; a first parabolic reflector configured to focus an inner portion of the hollow conical beam to a first focal point in the trapping region; and a second parabolic reflector configured to focus an outer portion of the hollow conical beam to a second focal point in the trapping region.

20 Claims, 8 Drawing Sheets

(56) References Cited

OTHER PUBLICATIONS

R.G. Pinnick et al, "Fluorescence spectra of atmospheric aerosol at Adelphi, Maryland, USA: measurement and classification of single particles containing organic carbon," Atmos. Environ., 38, 657-1672 (2004).
Y.L. Pan et al, "Single-particle laser-induced fluorescence spectra of biological and other organic-carbon aerosols in the atmosphere: measurements at New Haven, Connecticut, and Las Cruces, New Mexico," J. Geophys. Res., 112, D24S19, 1-15 (2007).
Y. L. Pan et al, "Fluorescence spectra of atmospheric aerosol particles measured using one or two excitation wavelengths: Comparison of classification schemes employing different emission and scattering results," Optics Express, 18(12), 12436-12457 (2010).
Yong-Le Pan, Aimable Kalume, Isaac C. D. Lenton, Timo A. Nieminen, Alex B. Stilgoe, Halina Rubinsztein-Dunlop, Leonid A. Beresnev, Chuji Wang, and Joshua L. Santarpia, "Optical-trapping of particles in air using parabolic reflectors and a hollow laser beam," Opt. Express 27, 33061-33069 (2019) (published Oct. 28, 2019).

\* cited by examiner

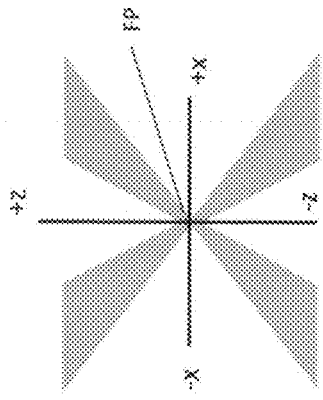
FIG. 3A
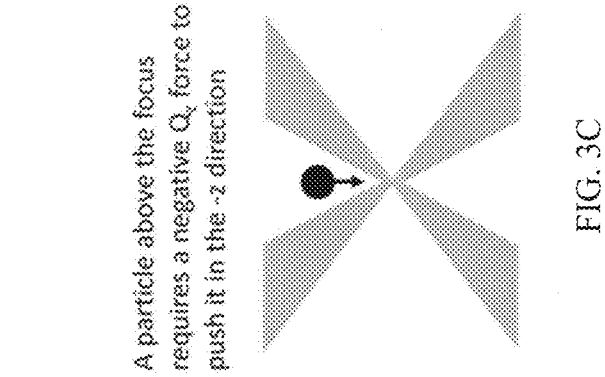
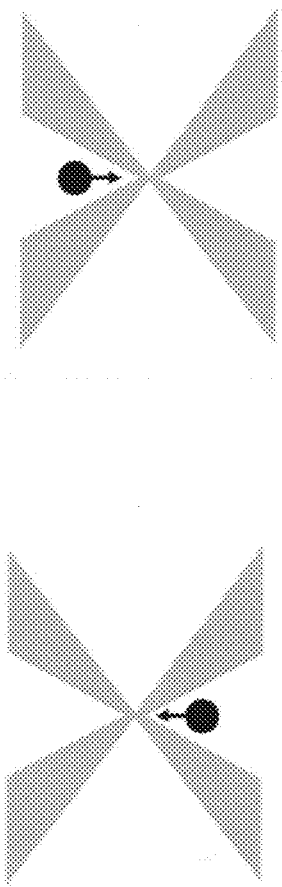
FIG. 3B
FIG. 3C

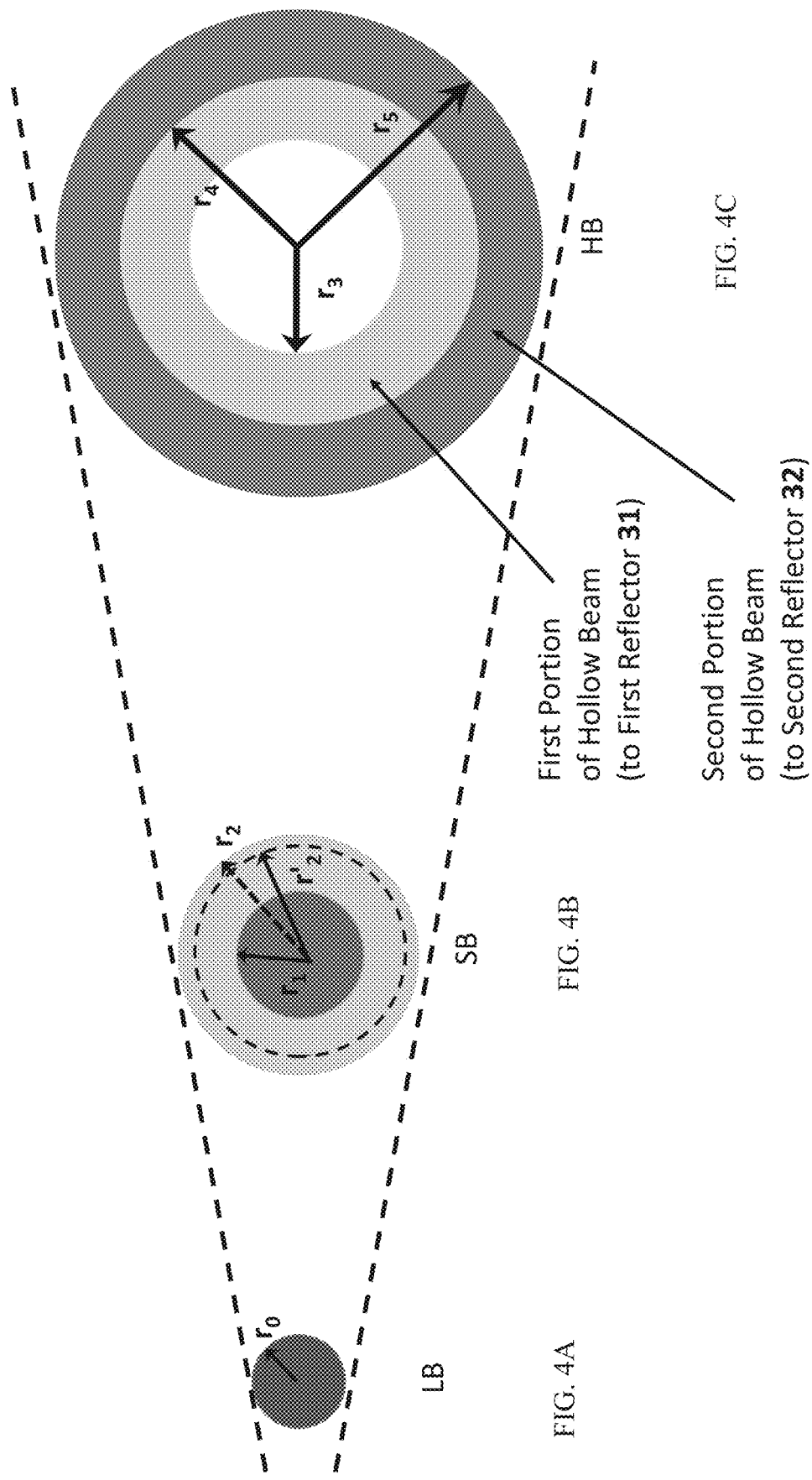

Particle trapped at focal point

Absorption particle trapped at lowest light intensity area

Transparent particles trapped at focal points with two foci displaced

OPTICAL TRAPPING OF AIRBORNE PARTICLES USING DUAL COUNTER-PROPAGATING HOLLOW CONICAL BEAMS

GOVERNMENT INTEREST

The invention described herein may be manufactured, used and licensed by or for the U.S. Government without the payment of royalties thereon.

BACKGROUND OF THE INVENTION

Field

Embodiments of the present invention are generally directed to trapping and holding airborne particles, and more particularly, to optical traps which generate and use dual counter propagating hollow conical beams for trapping and holding particles in air.

Description of Related Art

Airborne particles pose many problems. The ability to trap airborne particles for inspection and/or measurement is important for many applications. Conventional techniques to optically trap airborne particles use radiation pressure force, photophoretic force, or the combination. Trapping a particle in air is more difficult than trapping a particle in a liquid (or on a substrate) since the trap must overcome stronger scattering forces, gravity and air turbulence without help from the higher viscosity of a liquid. Thus, very high numerical aperture (NA) optics, typically in excess of 0.9, is required to produce a strong enough gradient force to trap airborne particles. Trapping airborne particles using the photophoretic force may be advantageous in some cases since the photophoretic force can be 4 to 5 orders of magnitude stronger than the gradient force typically used in optical tweezers for absorbing particles.

U.S. Pat. No. 9,443,631 titled "Optical Trap Using a Focused Hollow-Beam for Trapping and Holding Both Absorbing and Non-Absorbing Airborne Particles" to Yongle Pan and Brandon F. Redding which issued on Sep. 13, 2016, incorporated herein by reference in its entirety, discloses an optical trap which is configured to focus a single shaped laser beam to produce a low-light-intensity region for photophoretic trapping of absorbing particles while simultaneously reducing the scattering force for gradient force trapping of transparent particles. When an embodiment of this optical trap was used in conjunction with an air handling system designed to continuously sample particles from air, the optical trap was shown to be able successively trap arriving absorbing particles sampled. But, experiments showed that the optical trap system was not able to successively trap arriving transparent particles at a reasonable trapping efficiency (i.e., >1%). It was determined that the relatively weak restoring force in this optical trap cannot provide high trapping efficiency for transparent particles, especially for flowing through transparent particles with high refractive indexes (i.e., n>1.5). In order to trap and hold arriving transparent particles with high trapping efficiency, an optical trap should be able to successively catch and trap at least 20% of the particles from continuously sampling.

BRIEF SUMMARY OF THE INVENTION

Embodiments of the present invention are directed to devices, systems and methods for trapping and holding airborne particles. More particularly, an optical trap is disclosed which generates and uses dual counter-propagating hollow conical beams for trapping and holding particles in air. The optical trap can be used for trapping and holding both absorbing and non-absorbing, spherical and irregularly shaped, liquid and solid airborne particles.

According to embodiments, the optical trap may include: a light source for generating a beam of light; optics for shaping and forming a hollow conical beam having a ring geometry from the beam of light; a trapping region where a particle can be present to be trapped; a first parabolic reflector configured to focus an inner portion of the hollow conical beam to a first focal point in the trapping region; and a second parabolic reflector configured to focus an outer portion of the hollow conical beam to a second focal point in the trapping region.

Depending on the configuration and/or operation of the optical trap, one or more particles may be trapped (i) at the first focal point; (ii) at the second focal point; (iii) at both the first and second focal points where there is a separation distance there between; (iv) at a position where the first and second focal points coincide; and/or (v) between the first and second focal points.

In embodiments, there may be an adjustable distance provided between the first and second focal points of the first and second parabolic reflectors. And, more particularly, the optical trap may further include: a first stage to move the first parabolic reflector in the trapping region to change the position of the first focal point; and/or a second stage to move the second parabolic reflector in the trapping region to change the position of the second focal point.

The first parabolic reflector may be arranged to receive light of the inner portion of the hollow conical beam from the bottom and focuses the light upward towards the first focal point, and the second parabolic reflector may be arranged to receive light of the outer portion of the hollow conical beam from the bottom and focuses the light downward towards the second focal point. The first and second parabolic reflectors may have relatively large numerical apertures (N.A.) of at least 0.55 (e.g., 0.92 and 0.60, respectively).

The light source may be a laser, a light emitting diode (LED), or other light source with a narrow wavelength band or a broad wavelength band either in continuous wave (CW) or pulsed format, for instance. The optics may include, for instance, a pair of axicon lenses, spatial light modulators (SLM), phase and amplitude mask, biaxial crystals, diffraction pattern, optical components configured to produce an aberration, and/or an interference pattern of coherent light source using a single or multiple laser or light beams to produce the hollow conical beam. Moreover, the optics may further include: a pair of lens with different focal lengths, which are used to controlling the thickness of the hollow conical beam. In some embodiments, a mirror may be positioned between the optics and the first and second parabolic reflectors for changing the direction of the hollow conical beam. The hollow conical beam having the ring geometry includes an annular region with a central opening or void of substantially no intensity. Particles can be introduced into the trapping region through an opening in a central portion of the second parabolic reflector not otherwise used for focusing.

The optical trap may further include a controller configured to control the trapping and holding of particles. Such a controller may be configured to generate signals to: deliver one or more airborne particles to the trapping region; trap one or more airborne particles in the trapping region;

measure one or more properties of the one or more trapped airborne particles; and release the one or more trapped airborne particles.

In further embodiments, a particle detection and measuring system is disclosed. Such a system may include: the optical trap for trapping and holding both absorbing and non-absorbing, spherical or non-spherical, solid or liquid airborne particles; a particle detector configured to detect an airborne particle approaching and/or within the trapping region of the optical trap; and a measurement device to measure at least one property (e.g., physical, chemical, and biological properties) of the trapped particle. In such a system, the optical trap may be configured to trap and hold only about one particle at any one time. In further embodiments, the system may also include at least one source configured to illuminate and/or excite the trapped one or more airborne particles. For example, the measurement device may be configured to measure one or more of: imaging, Raman spectra, Raman emission in one or more wavelength bands, laser-induced breakdown emission in one or more wavelength bands, laser-induced breakdown spectra, spark-induced breakdown emission in one or more wavelength bands, spark-induced breakdown spectra, fluorescence in one or more wavelength bands, fluorescence spectra, multi-photon excited fluorescence, thermal emission at one or more wavelengths, thermal emission spectra, or light scattering over one or more angles, light scattering at multiple wavelengths, absorption spectra of the particle, particle size and shape. The optical trap has an average trapping efficiency of at least 20% (and, more preferably, at, near, or approaching 100%) of the particles from continuously sampling.

In other embodiments, a method for continuously sampling particles from air using the particle detection and measuring system is disclosed. The method may comprise: delivering air including airborne particles toward a trapping region; detecting an airborne particle in the air approaching and/or within the trapping region; trapping one or more airborne particles in the optical trap; measuring a property of the trapped one or more airborne particles; and releasing the trapped one or more airborne particles. Additionally, the method may include: determining from the measured property a parameter related to particle shape, size, refractive index, absorption, molecular structures and compositions, chemical reactions, or any combination thereof of the trapped one or more airborne particles.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIGS. 3A, 3B, and 3C illustrate the longitudinal cross-section a single focused conical beam in more detail and the optical trapping force on a trapped airborne particle.

FIGS. 4A, 4B, and 4C show schematics of different cross-sections of the light beam along the direction of propagation involved in forming the optical trap illustrated in FIG. 1 and their relationships.

DETAILED DESCRIPTION

A novel optical trapping apparatus and methods for using the same are disclosed. This innovative optical trapping generates and utilizes dual counter-propagating hollow conical beams for trapping and holding particles in air. This technology has been demonstrated for trapping of both absorbing and transparent particles with either spherical or spatially irregular geometries.

The optical trap is formed by manipulating a single light beam output from a light source. This light beam is shaped and formed into a hollow beam having a ring or ring-like geometry or profile, i.e., the center of the beam is removed where the contribution to the incident photon momentum along the optical axis is strongest. The hollow beam is then is split into two portions which are focused, using a pair of parabolic reflectors, to form the dual counter-propagating hollow conical beams. Particle trapping occurs at and/or between the focal points of the hollow conical beams.

Figure 1:
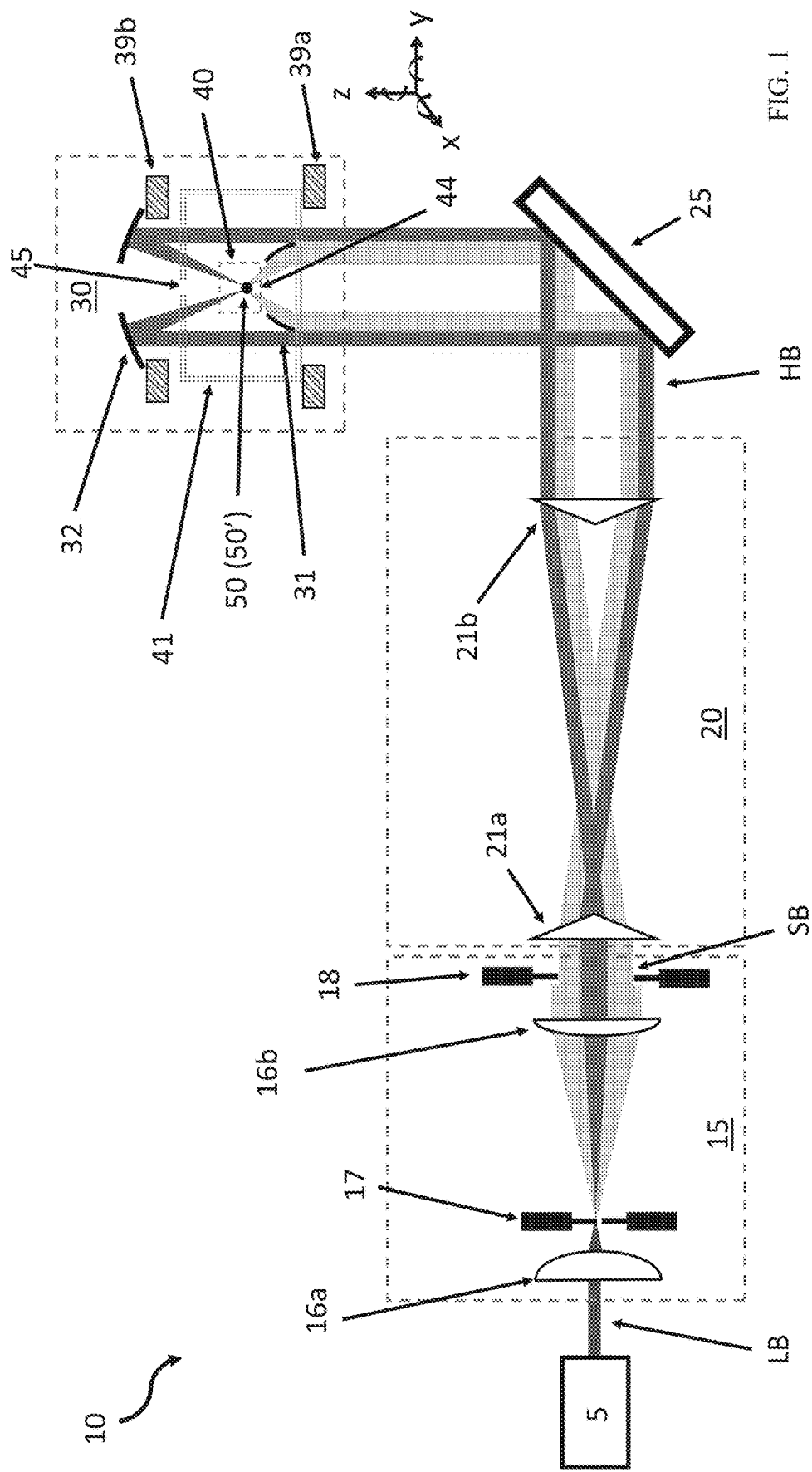
FIG. 1 is a schematic of the optical trapping apparatus using two focusing parabolic reflectors according to embodiments of the present invention.

FIG. 1 is a schematic illustration of an optical trap 10 for trapping particles according to an embodiment of the present invention. The optical trap 10 is specifically configured to generate and use dual counter-propagating hollow conical beams for trapping and holding particles in air.

Light source 5 generates a beam of light (see FIG. 4A) indicated here as light beam LB. The particular wavelength of light used is not believed to be critical for the optical trap 10, although there may be a multitude of reasons for selecting a particular laser. The light may be in the ultraviolet (UV), visible, and/or infrared (IR) wavelength region, for example. Light source 5 may be a laser, a light emitting diode (LED), or other light source with a narrow wavelength band or a broad wavelength band either in continuous wave (CW) or pulsed format. In one exemplary embodiment, light source 5 may be an Ar-ion laser operating at a wavelength $\lambda$ of 488 nm in continuous wave (CW) mode and providing approximately 750 mW of power. In lieu of an actual laser, a light source with a high spatial coherence could be used to form the equivalent to light beam LB having a focal spot with high power, such as a super-luminescent diode or a super-continuum source.

In a beam shaping region 15, optics shape the light beam LB into a shaped beam of light (see FIG. 4(B)) indicated here as shaped beam SB with radius $r_0$. While still a coherent beam of light, the shaped beam SB has internal radius $r_1$ and outer radius $r_2$ which affect the thickness of the hollow beam HB (later discussed).

The optics in region 15 are used to control each of these radii. These optics may include a pair of aspheric lenses 16a, 16b, a spatial filter (pinhole) 17, and iris 18. The entering light beam LB is cleaned by a pair of aspheric lenses 16a, 16b and a spatial filter (pinhole), lenses 16a and 16b also expand the light beam LB into a collimated beam of large radius $r_2$. The focal lengths of the lenses 16a, 16b, respectively, may differ and relate the outer radii of the laser beam LB and the shaped beam SB as $r_2/r_0 = f_2/f_1$, where $f_1$ and $f_2$ are the focal lengths of lenses 16a and 16b. Expanding and collimating beam LB into SB might also be realized by other means, such as using convex lens and mirror.

An iris 18 may be used to finely adjust or tune the final outer radius into $r'_2$ of the shaped beam SB. The iris 18 may be comprised of multiple blades (e.g., 9 or 15), driven by a motor (not shown), which form an adjustable sized diaphragm opening. As the iris is closed, the thickness of the beam ring becomes narrower. Conversely, when the iris is open, the ring thickness becomes wider. The iris is not strictly required for all embodiments. A depiction of the cross-section of the shaped beam SB along the direction of propagation is shown in FIG. 4B. In one exemplary embodiment, the beam before the iris had a diameter of approximately 2 cm and after the iris it was reduced the size to be 1.3 cm. This may depend on the optics used.

Next, in a hollow beam forming region 20, optics take the shaped beam SB and form a hollow beam HB. The optics in region 20 may include a set of one or more typical optical elements used for shaping light. The hollow beam HB is shaped like a ring, that is, an annular region with a central opening or void of substantially no intensity. Such a ring geometry or profile can be generated, for instance, with a pair of axicons, spatial light modulators (SLM), phase and amplitude mask, biaxial crystals, diffraction pattern, optical components configured to produce an aberration, and/or an interference pattern of coherent light source using a single or multiple laser or light beams. Here, optics 20 are shown as configured as a pair of axicon lenses 21a, 21b that act also as a beam expander.

The hollow beam HB has an inner radii $r_3$ and an outer radii $r_5$ which define its thickness. In general, the inner and outer radii of the hollow beam HB are determined by the distance between the two axicons 21a, 21b. Hollow beam HB includes an intermediate radii $r_4$ that acts as a split point of the hollow beam HB in the dual counter-propagating conical beam forming region 30 of the device 10. The thickness of the beam ring or the difference of outer and inner radii of the beam $r_5 - r_3$ is determined by $r'_2$ ($r_5 - r_3 = r'_2$). A depiction of the cross-section hollow beam HB along the direction of propagation is shown in FIG. 4C.

Once key radii of the hollow beam HB have been set, the optical trap 10 can be used for most particles without changing these parameters. The hollow beam HB would generally stay the same and be turned 'on' to hold a particle in place and then the light beam LB could be turned 'off' or blocked altogether (e.g., with a shutter) to release a particle.

After forming, the hollow beam HB is directed to a dual counter-propagating hollow conical beams forming region 30. Here, the hollow beam HB is essentially split to form a pair of hollow conical beams that are focused in different directions toward a trapping region 40. It is within the trapping region 40 where one or more airborne particles 50 can be trapped and held at or between the foci of the dual counter-propagating hollow conical beams.

A first parabolic reflector 31 and a second parabolic reflector 32 are included in hollow conical beams forming region 30, which together, are used to form the dual counter-propagating hollow conical beams. These reflectors 31, 32 have highly mirrored (reflective) surface with a parabolic profile. They may preferably have high numerical apertures (N.A.) of at least 0.55. As the figure is a cross-sectional view, it will be appreciated that the surfaces of reflector 31, 32 wrap symmetrically about the normal axis line of region 30. Only an active portion of the reflector surface actually used for reflection needs to be present. Thus, to reduce mass and/or to provide opening(s), portions of the reflectors 31, 32 (typically near the normal axis) may be omitted. With respect to embodiment shown, the bottom central portion of the first reflector 31 is omitted, and the top central portion of the second reflector 32 is omitted (at opening 45).

As shown, the first reflector 31 is positioned slightly below the trapping region 40 whereas the second reflector 32 is positioned above the trapping region 40. The first reflector 31 receives and upwardly reflects a first (inner) portion of the hollow beam HB between the inner radii $r_3$ and the intermediate radii $r_4$ to a first focal point in the trapping region 40. Similarly, the second reflector 32 receives and downwardly reflects a second (outer) portion of the hollow beam HB between the intermediate radii $r_4$ and outer radii $r_5$ to a second focal point in the trapping region 40. Because the two hollow conical beams approach the trapping regions 40 from opposing directions, they are considered counter-propagating.

The first parabolic reflector 31 may be mounted on a first moveable stage 39a, and/or the second parabolic reflector 32 may be mounted on a second stage 39b. The moveable stages 39a, 39b may be controlled to adjust the locations of the focal points of the reflectors 31, 32 in the trapping region 40. The moveable stages may provide freedom for two-dimensional angle-tilting, and/or three-dimensional translation. For instance, stages 39a, 39b may be five- or six-dimension adjustable (e.g., x, y, z-translating, and/or along x, y, z-axis tiling). Typically, the focal points will be made to align with the normal axis line of region 30. The stages 39a, 39b might be stepper motor-controlled, for instance, providing 1 µm resolution.

Additional optics can be interposed along the light beam path. As shown in FIG. 1, a mirror 25 is provided which changes the direction to the hollow beam HB between region 20 and region 30. Here, the hollow beam HB is directed to propagate upwards by a 45° placed mirror 25. This enables a more compact system and/or the direction of the hollow beam HB to be changed. It is believed that the trap will work most efficiently if the light is propagating upward (against gravity) in the focal region. It should also work with the light travelling with gravity (i.e. aimed down), or form the trapping beams orientated horizontally without the 45° placed mirror 25.

Particles 50 in the trapping region 40 can be trapped and held by the first and second reflected beams. A trapped particle is indicated at 50'. The size of the particles 50 may vary depending on the environment and/or desired application(s). Airborne particles ranging from 0.6 to 100 micrometers may be quite common in environments. Typical sizes of a single or aggregates of a group of bacteria and bacterial spores may range from 0.6 to 10 µm. Typical sizes of anthrax spores range from 1.1 to 1.7 µm in length and 0.4 to 0.6 µm in diameter. Typical sizes of fungal spores may range 2 to 20 µm in diameter. Pollens typically can be 5 to 100 µm in diameter. These exemplary particles as well as other larger or smaller in diameters should be able to be held with the trap 10. Typically, it is envisioned that the optical trap 10 will trap and hold only about one particle at any one time.

In some embodiments, the ultimate size trapping region 40 may be limited and/or defined (at least some to extent) by a containment cell 41. This containment cell 41 also helps to minimize air turbulence near the trapping position. One or more windows and/or opening may be included in cell 41. For instance, a bottom window 43 is transparent to the hollow beam HB. Windows may be formed of a suitable light transparent material, such as glass. A top (physical) opening 45 may provide a point or entry/exit for particles 50 into/out of the cell, and/or for taking particle measurements. Other windows/openings and different locations are certainly possible. While a particle 50' is trapped and held in the optical trap 10, one or more properties of that trapped particle 50' may be measured or otherwise made. One or more measuring devices may be positioned proximate to the trapping region 40 for this purpose. As all sides of the containment cell 41 are designed to be transparent, then any side or direction can be used for observation and measurement, such as a window or opening 45 in the cell 41 to enable measurement of trapping particles to be made.

The measuring device 170 (FIG. 7) may be a camera or other measurement device that is configured to inspect or measure at least one property of the trapped particle 50' while it is held in the optical trap 10. These measurements may include, for example, Raman, fluorescence, thermal emission, laser-induced breakdown spectroscopy (LIBS), spark-induced breakdown spectroscopy (SIBS), elastic scattering over one, a few or many angles or wavelengths. The Raman, fluorescence, thermal emission, LIBS and SIBS may each be measured at one or more emission bands, including the case of sufficient bands to be considered a spectrum. The foregoing list is not exhaustive and other measurement techniques may be used. Devices for performing such measurements are generally known and will not be described in greater detail.

Figure 2:
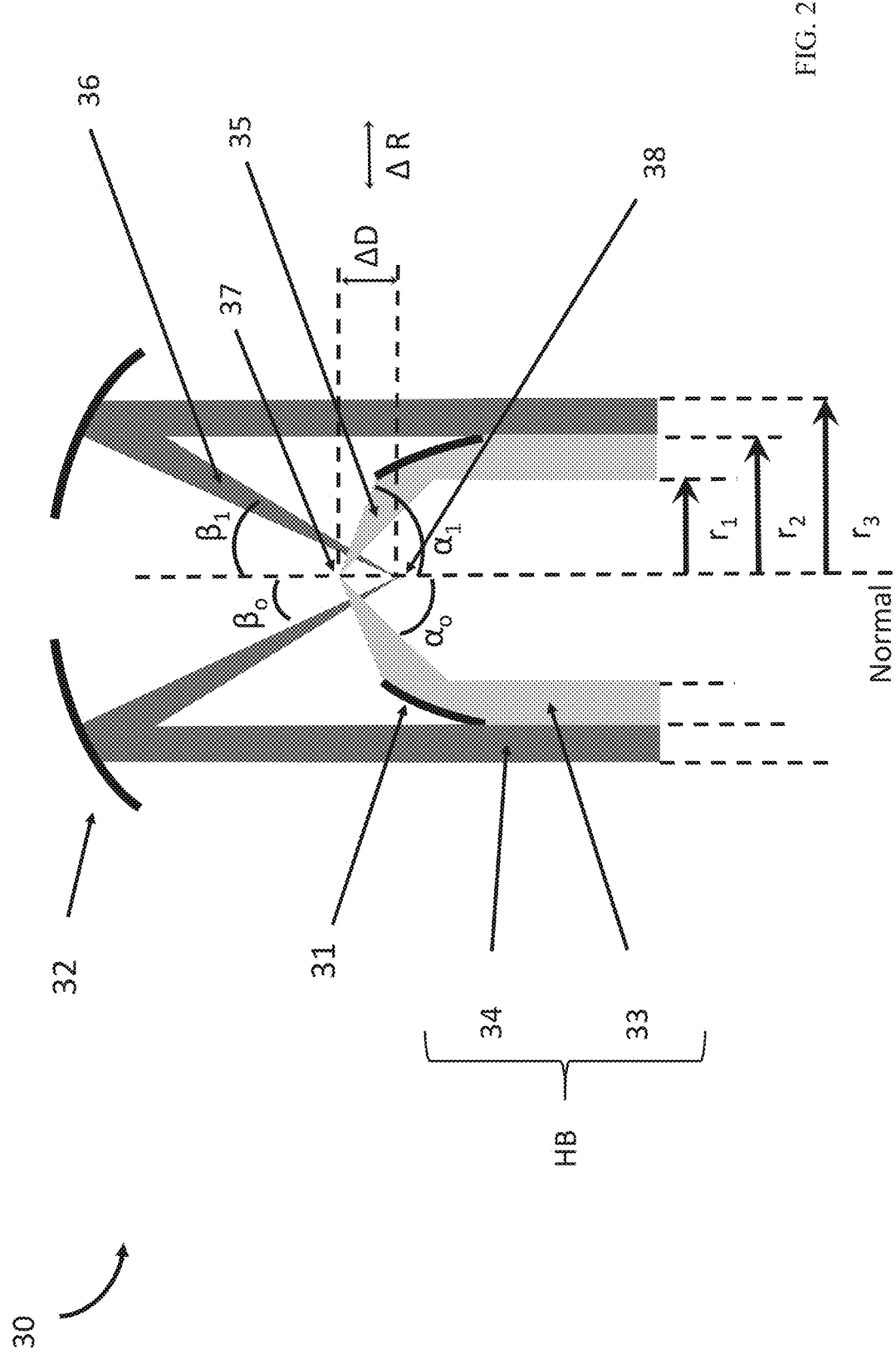
FIG. 2 is a more detailed schematic of the dual counter-propagating hollow conical beams forming region of the optical trap in FIG. 1.

FIG. 2 is a more detailed schematic of the dual counter-propagating hollow conical beams forming region 30 of the optical trap 10. The hollow beam HB enters the region 30. Here, this is from the bottom, but other locations are possible based on the orientation of the region 30. The hollow beam HB has a circular, or ring geometry, which includes an annular region with a central opening or void of no intensity.

The hollow beam HB has an inner radius $r_3$ and outer radius $r_5$, and an intermediate radius $r_4$ defining a first (inner) portion 33 and a second (output) portion 34 which are split. The first portion 33 of the hollow beam HB travels to first parabolic reflector 31, and the second portion 34 of the hollow beam HB travels to second parabolic reflector 32. The first portion 33 is reflected by the first parabolic reflector 31 forming a first conical beam 35. More particularly, the first parabolic reflector 31 receives the first portion 33 of the hollow beam HB light from the bottom and reflects and focuses it somewhat upwardly. The outer radius of the first parabolic reflector 31 coincides with the intermediate radius $r_4$ of the hollow beam HB which that beam is split. The first conical beam 35 converges to a first focal point 37.

The second parabolic reflector 32 receives the second portion 34 of the hollow beam HB from the bottom and reflects and focuses it downwardly to form a second conical beam 36. It converges to a second focal point 38. The reflector 32 needs to be sized to receive and focused the light of portion 34.

Together the first and second conical beams 35, 36 form dual counter-propagating hollow conical beams. The trapping region 40 is sized to accommodate the focal points 37, 38 and sufficient space around them where particle trapping takes place.

Because of the parabolic nature of the reflectors 31, 32, the first reflected beam and the second reflected beam each have a discrete focal point FP (37, 38). Moveable stages 39a, 39b for which the reflectors may be mounted on have been omitted in this figure. These adjust the positions of the focal points. The axial and radial separation between the two focal points 37, 38 are referred to as $\Delta D$ and $\Delta R$, respectively. The effects of changing these separation is later explained based on experiments conducted by the inventor.

Inner and outer angles of the first conical beam 35 measured to the normal axis line are defined as $\alpha_0$ and $\alpha_1$, respectively. Similarly, inner and outer angles of the second conical beam 36 measured to the normal axis are defined as $\beta_0$ and $\beta_1$ respectively.

The inventors built and tested an optical trap according to one specific embodiment built and tested by the inventors. In this optical trap, the first parabolic reflector has a focal length of about 2.0 mm and a reflective surface diameter of about 12.0-19.0 mm; and the second parabolic reflector has a focal length of about 19.0 mm and a reflective surface diameter of about 5.0-30.0 mm. Table I, below, further provides exemplary dimensions of the conical beam forming region 30 as depicted in FIG. 2 for this optical trap. These parameters can be adjusted in different trapping embodiments.

TABLE I

| | |
|---|---|
| $\alpha_0$ | 36° |
| $\alpha_1$ | 67° |
| $\beta_0$ | 28° |
| $\beta_1$ | 37° |
| $r_3$ | 6.0 mm |
| $r_4$ | 9.5 mm |
| $r_5$ | 12.5 mm |

In operation of this specific optical trap, the inner part of the beam (dia.=19.0 mm) was focused into an upward propagating (UP) hollow conical beam using the first parabolic reflector 31 (focal length=2.0 mm, diameter=12.0 mm-19.0 mm), the beam was focused onto its optical axis at 2.5 mm above the reflector and 6.5 mm from its closest surface. Meanwhile, the outer part of the beam (dia.=25.0 mm) was focused into a downward propagating (DP) hollow conical beam using the second parabolic reflector 32 (focal length=19.0 mm, diameter=5.0 mm-30.0 mm). The axes of the two reflectors were aligned to overlap each other, and the two foci from the two hollow conical beams were lined up along the optical axes of the reflectors with a vertical variable displacement $\Delta D$ ranging from −10 µm to 10 µm. In order to better visualizing the alignment of the two hollow conical beams, a pin hole or the smoke (from a burning fiber) was used. The two foci were positioned near the center of a containment glass chamber, which was used to minimize air turbulence near the trapping region. Both the top and bottom windows/openings of the chamber had a circular hole of 4.0 mm in diameter. The two openings enabled particles to be introduced and removed from the chamber. The selected parabolic reflectors 31 and 32 act as focusing optics with an N.A. of 0.92 and 0.60, respectively. With sufficient axial separation, each of the two parabolic reflectors is capable of forming an independent trapping for transparent airborne particles, but can also be used together for improved results.

FIGS. 3A, 3B, and 3C illustrate the longitudinal cross-section of a generic, single focused conical beam in more detail and the optical trapping force on a trapped airborne particle to explain the trapping forces.

The radiation pressure force of each of the hollow conical beams is capable of trapping and holding transparent (non-absorbing) airborne particles while the photophoretic force dominate to trap absorbing particles. The radiation pressure force results from the transport of momentum from photons to a particle. More particularly, radiation pressure forces are a combination of a gradient force and a scattering force. If a particle is near the focal point of the conical beam, the gradient force will pull the particle back toward the high intensity region at the focus, providing the restoring force required to trap a particle. On the other hand, the scattering force, which results from the transfer of momentum from photons scattered off a particle, pushes the particle in the direction of light propagation and does not provide the required restoring force. Roughly speaking, optical trapping is possible when the gradient force overcomes the scattering force.

By comparison, the photophoretic force results from the interaction between a heated particle and the surrounding gas molecules. If a light beam impinges on an absorbing particle, some of the light will be absorbed and converted to heat. In particular, if a particle is heated asymmetrically (e.g. if a strongly absorbing particle is illuminated from one side), then gas molecules on the higher temperature side of the particle will also heat up and subsequently collide with the particle at higher velocities, imposing a net force pushing the particle toward its cold side. For a strongly absorbing particle, this photophoretic force can be 4 to 5 orders of magnitude stronger than the gradient force typically used in optical tweezers.

FIG. 3A shows a single focused conical beam. The beam is conical with a longitudinal cross-section depicted in the x-z plane. No particle is presently trapped here, but would be held at or near the focal point FP (x, y, z=0, 0, 0). The beam converges towards the focal point and expands and diverges thereafter. For a parabolic reflector, the focal point FP is a discrete point. FIG. 3B shows when a particle drifts below the focal point. A particle below the focus requires a positive $Q_z$ force to push it in the +z direction. FIG. 3C shows when a particle drifts above the focal point. A particle above the focus requires a negative $Q_z$ force to push it in the −z direction. The focused beam generates a restorative force which urges the particle back toward the focal point FP. While the above-description refers to particle displacement in the z direction, it will be appreciated that the particle displacements in the x- and/or y-directions will be similar.

FIGS. 4A, 4B, and 4C show schematics of the cross-sections of the light beams along the direction of propagation involved in forming the optical trap 10 illustrated in FIG. 1 and their relationships. In actuality, these beams are one contiguous beam of light which is manipulated at different points as it propagates. To begin, FIG. 4A shows the light beam LB output by the light source 5. It is coherent beam of light, generally circular in cross-section, having an outer radius $r_0$ defined by the light source 5. As an example, the light beam LB may be a collimated beam with a diameter of 13.0 mm) output from a continuous wave (CW) laser (e.g., 532 nm or 488 nm, ~1 W).

FIG. 4B shows the shaped beam of light SB formed from the light beam LB in region 15 of device 40. While still a coherent beam of light, the shaped beam SB has a first portion having a first intermediate radius $r_1$ and a second portion having a second outer $r_2$. These radii affect the thickness of the hollow beam HB. Optics in beam shaping region 15 are used to control each of the radii $r_1$ and $r_2$ of the shaped beam SB which in turn affect the hollow beam HB.

The entering light beam LB is cleaned by a pair of aspheric lenses 16a, 16b and a spatial filter (pinhole) 17 and control the second outer radius $r_2$. The lenses 16a, 16b expand the light beam LB into a collimated beam of large radius. The focal lengths $f_1$, $f_2$ of the lenses 16a, 16b, respectively, relate the outer radii of the laser beam LB and the shaped beam SB, where $f_2/f_1=r_2/r_0$.

The optional iris 18 may be used to finely adjust or tune the final outer radius $r'_2$ of the shaped beam SB. It may be comprised of multiple blades (e.g., 9 or 15), driven by a motor (not shown), which form an adjustable sized diaphragm opening. The iris is not strictly required for all embodiments.

The outer radius $r_2$ of the shaped beam SB effect the wall thickness of the hollow beam (as further discussed). The intermediate radius $r_1$ is just used to define the radius between the outer and inner parts of the beam for forming the count-propagating conical hollow beams.

FIG. 4C shows the hollow beam HB having a ring geometry formed from the shaped beam of light SB in region 20 of the device. The hollow beam HB has an inner radii $r_3$ and an outer radii $r_5$ which define its thickness ($r_5-r_3$). It also includes an intermediate radius $r_4$ which acts as a split point of the hollow beam HB later in the dual counter-propagating hollow conical beams forming region 30 of the optical trap 10. A first portion of the hollow beam HB between the inner radii $r_3$ and the intermediate radii $r_4$ travels to the first reflector 31 where it is be reflected to a first focal point. Similarly, a second portion of the hollow beam HB between the intermediate radii $r_4$ and outer radii $r_5$ travels to the second reflector 32 where is will be reflected to a second focal point. Ordinarily, the intermediate radii $r_4$ will be fixed by the choice of the (outer) radii of the first and second reflectors by the designer. However, in some embodiments, different sets of first and second reflectors with different sizes and focal lengths may be substituted out (e.g., by or with the moveable stages). As such, the intermediate radii $r_4$ might be adjusted to accommodate a particular set of reflectors. The relationships between the radii of the shaped beam SB and the hollow beam HB are as follows: $r_4-r_3=r'_2-r_1$ and $r_5-r_4=r_1$.

In one non-limiting example, starting with a light beam LB having a diameter of 13.0 mm, the beam can be ultimately formed into a collimated hollow beam HB with a diameter of 25.0 mm and a wall thickness of 6.5 mm using optics 15 and optics 20.

Figure 5A:
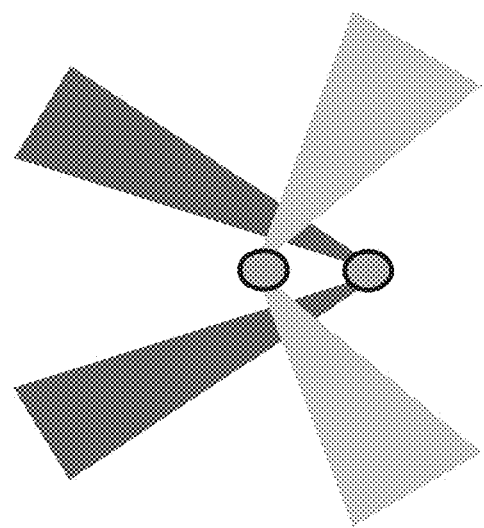
FIGS. 5A, 5B and 5C are schematics showing different configurations of the focal points of the dual counter-propagating hollow conical beams that may be used in embodiments.
Figure 5B:
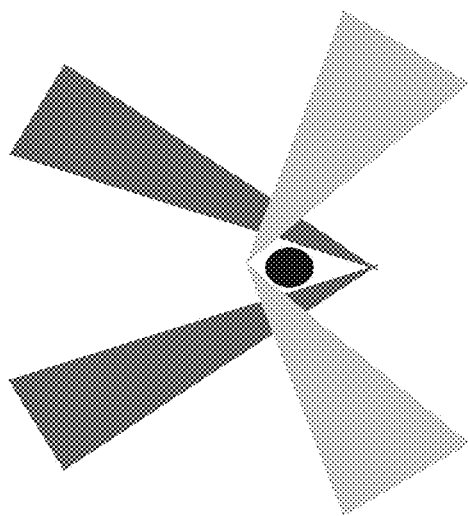
Figure 5C:
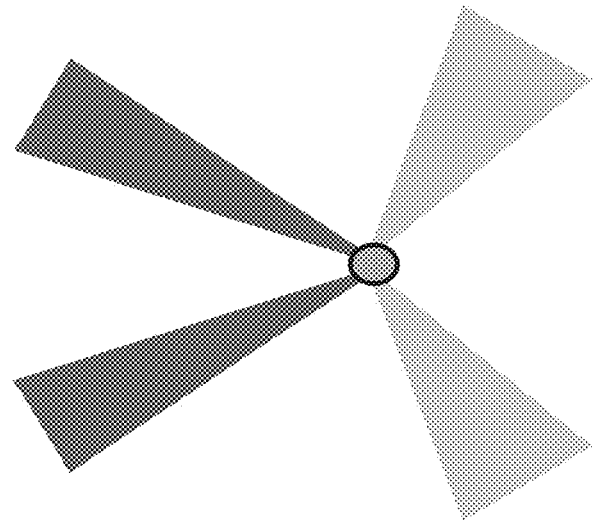

FIGS. 5A, 5B and 5C are schematics showing different configurations of the focal points of the dual counter-propagating hollow conical beams that may be used in embodiments, where FIG. 5A is an example of a trapped, non-absorbing particle; FIG. 5B is an example of a trapped, absorbing particle; and FIG. 5C is an example of two, trapped non-absorbing particles. These particles cold be spherically or irregularly shaped, either in liquid or solid form. The focusing characteristic of the dual counter-propagating hollow conical beams are judiciously provided with the choice of the first and second reflectors 31, 32.

For ease of explanation, only the converging portions of the hollow conical beams have been shown in these figures. The diverging portion of the hollow conical beams which extend past the focal points are nonetheless present (similarly as depicted in FIGS. 3A-3C for a single beam) but not shown here.

The locations of the focal points 37, 38 of the first and second reflectors 31, 32 can be adjusted using the first and second stages 39a, 39b. FIG. 5A shows the focal points of the dual counter-propagating hollow conical beams substantially coinciding (ΔD=0; ΔR=0) and a particle trapped at that location. FIG. 5B shows a slight overlap of the dual counter-propagating hollow conical beams where the foci are axially displaced (ΔD>0; ΔR=0) such that a small space is provided for particle trapping. This space has the lowest light intensity area. While one tapped particle is shown there, one or more additional particles could be trapped in the space if they are sufficiently small. FIG. 5C also shows a slight overlap of the dual counter-propagating hollow conical beams where the foci are axial displaced (ΔD>0; ΔR=0). However, instead of trapping wherein the low intensity space between the foci, transparent particles may be trapped at the focal points. While one tapped particle is shown at each foci, one or more additional particles could be trapped at the foci, if they are sufficiently small.

Accordingly, the optical trap 10 may be judiciously configured in embodiments to provide for trapping or one or more particles (i) at the first focal point 37; (ii) at the second focal point 38; (iii) at both the first and second focal points 37, 38 where there is a separation distance there between (ΔD>0); (iv) at a position where the first and second focal points 37, 38 coincide (ΔD=0); and/or (v) in a space between the first and second focal points 37, 38. (i.e., in the space of low intensity inside the hollow conical beams 35, 36 where they overlap).

The Yong-Le Pan, et al., Opt. Express 27 (2019) article, cited below at the end of the disclosure, provides simulated and experimental data. That data is briefly summarized here along with conclusions drawn from the same.

In simulations, different conical beam configurations were considered for the optical trap. The simulations assume the trapping force acting on a spherical particle from one hollow conical beam or two beams with different displacement ΔD (axially) or ΔR (radially) were numerically simulated using the T-matrix method. The trapping force is expressed in terms of the dimensionless quantity Q which is related to the actual force acting on the particle as F=QPn/c, where P is the incident laser power, n is the refractive index of the particle, and c is the speed of light. The trapping force was first presented as the trap depth in the plots in which the gray-scale bar represented the relative strength of the trap depth. It was calculated from the axial force for different ΔD along the beam axis. The trap depth is a measurement of the minimum peak restoring force (i.e., the maximum force that can be applied to a particle in any direction before it escapes the trap). Trap depth is proportional to the trapping robustness of the setup. The method used here to estimate the trap depth only considered the axial force. This is sufficient for small displacements between the two beams (when the radial force exceeds the axial force), but for large axial (ΔD) or radial (ΔR) displacements, other methods are required for providing a more accurate estimation of the trap depth. A point matching method was used to calculate the vector spherical wave function representation of the conical hollow beams. When the two beams are aligned, the phase of both beams was assumed to be uniform and equal. When the upper beam is displaced vertically, an additional phase correction was added corresponding to the difference in the path length of moving the upper reflector 32. For horizontal displacements, no additional phase change was added. This assumption is only valid for small angles/displacements.

The axial trap depth for different particle sizes (1-10 μm in diameter) with varying refractive indexes (n=1.01-2.0) were calculated for (a) only one upward propagating (UP) beam; (b) dual-beam with two foci overlapping each other; and (c) dual-beam with ΔD=5 μm. The axial trap depth for displacements ΔD from −15 μm to +15 μm for a particle with refractive index of 1.5 and diameters from 0.5 μm to 10 μm was also investigated. Here the trapping laser power in a single beam is the same as the total power in the dual-beam trapping. The white shaded region shows where the radial trap depth between the two traps is below 50% of the axial trap depth.

These simulations revealed that (1) dual conical beam trapping can improve axial trap depth and extend the size and refractive index range of particles that can be trapped compared to single beam trapping. Such a feature also means that dual-beam trapping with lower laser power can supply the same strength of restoring forces as single beam trapping with higher power; (2) the hollow beam trapping (by both single- and dual-beam) works better for big particles (2-10 μm) than for small particles (0.5-2 μm); (3) Dual-beam trapping with a perfect alignment (ΔD=0 μm) gives a similar force pattern as single-beam trapping. The main differences are: an extended range of particles that can be trapped by the dual-beam configuration, particularly for higher refractive index particles; and additional fringes due to the interference between the two beams. By adding a small phase difference between the upper and lower beam (e.g., by displacing the upper beam by a small distance), the trap depth can be optimized for a particular particle. (4) Single beam trapping may be more favorable for low refractive index particles with n~1.1-1.5, and dual-beam provides stronger trapping depth and extends the trapping to cover particles with refractive indexes n~1.1-1.9. (5) When there is a small displacement between the two foci, the force pattern is shifted and benefits trapping particles with an even higher refractive indexes (around 1.2-2.0), and a small gap between the two foci (+ΔD) improves trap depth. Once the two foci are separated by more than the particle diameter, the radial trap depth starts to reduce. This configuration is similar to trapping large particles with dual beam holographic optical tweezers. Once the two foci are displaced in the opposite direction (so that the two foci overlapped at a −ΔD), the axial trap depth decreases, and in some cases particles are no longer trapped.

In addition, two-dimensional force distributions were investigated on a spherical particle (dia.=5 μm, n=1.5) near the focal point using the UP beam only; the DP beam only; dual-beam trapping with a displacement; dual-beam trapping with a displacement ΔR; and with a displacement in both ΔD and ΔR. For such a particle, the UP beam and DP beam separately provide strong radial forces and strong axial forces in the beam propagation direction. However, the particle could not be strongly trapped as the force opposite to the beam propagation direction is relatively weak. The simulation illustrated how a single-beam trap only produce a weak axial restoring force even for relatively high N.A. focusing (0.92 max. for the UP beam), but barely noticeable restoring force for lower N.A. (0.6 max. for the DP beam). This drawback of using one trapping beam is overcome by using the dual-beam trapping configuration. More, it seems that the small positive axial displacements have negligible influence on the force strengths and directions, except for the extended force distribution along the axis. In contrast, a negative axial displacement resulted in a very small axial trap depth. The force field distributions were very sensitive to the radial displacements, even though it was as tiny, i.e., ΔR=1.0 μm or ΔR=2.0 μm. And the force was strongly asymmetrically distributed for the radial misalignment, and resulted in lower trapping efficiency. These results were also consistent with experimental trials that a perfect radial alignment (ΔR=0 μm) is more critical than the axial alignment.

Figure 6A:
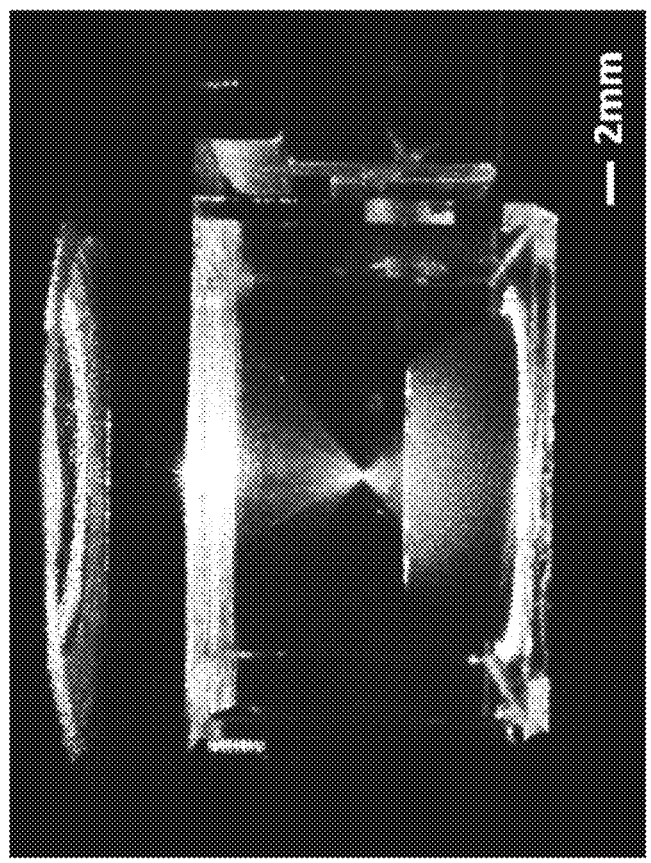
FIGS. 6A, 6B, 6C and 6D are photographs showing particle trapping using the dual counter-propagating hollow conical beams.
Figure 6B:
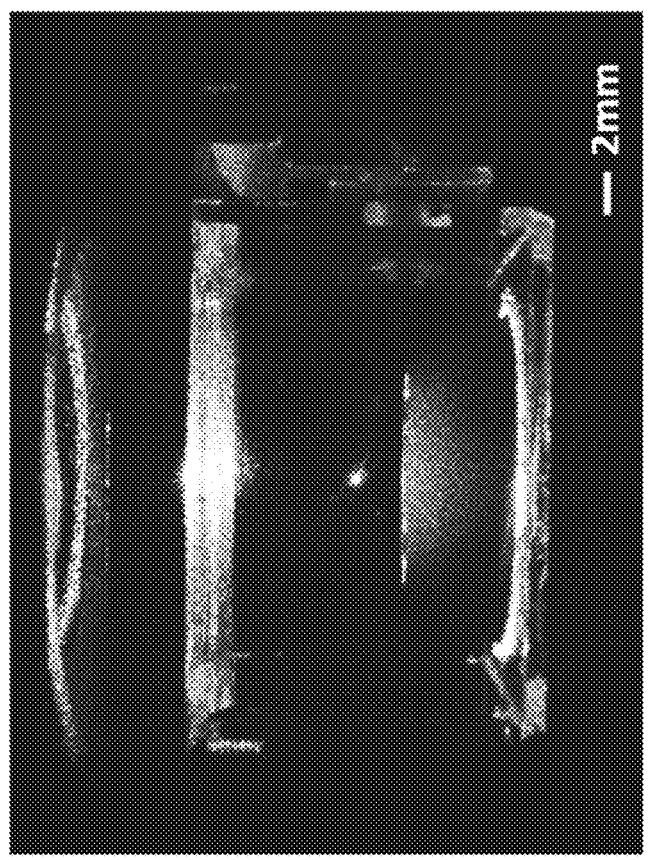
Figure 6D:
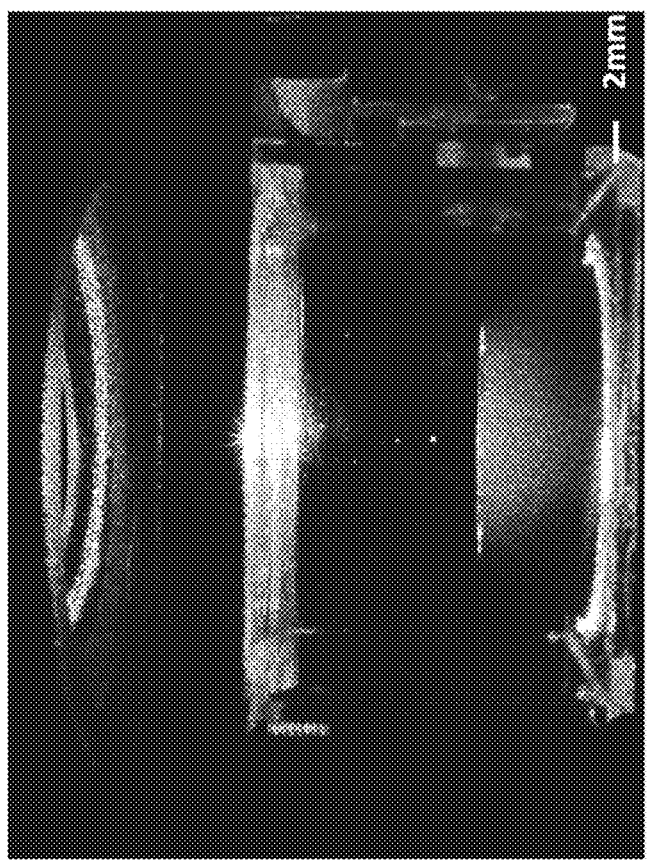
Figure 6C:
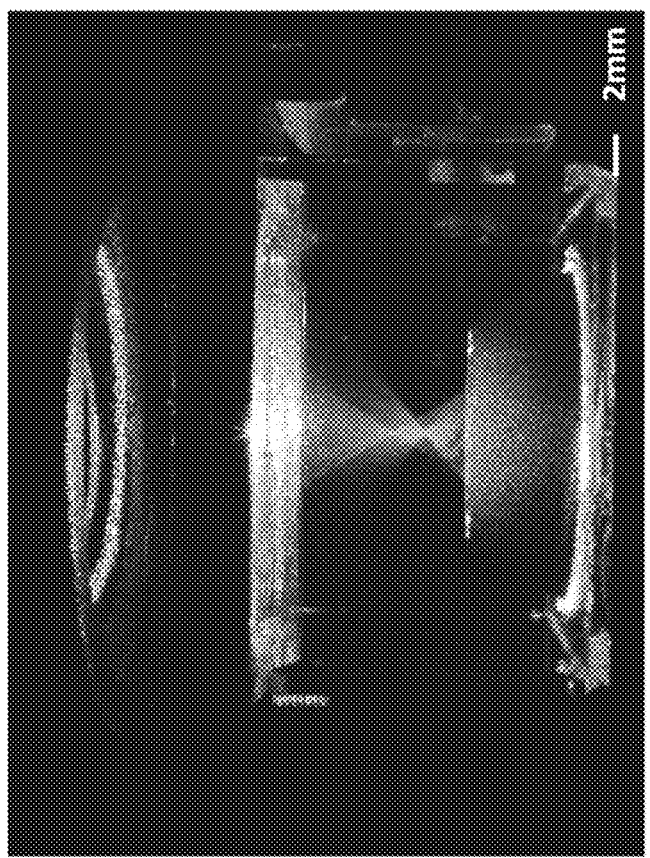

FIGS. 6A, 6B, 6C and 6D are photographs showing particle trapping using the dual counter-propagating hollow conical beams. FIG. 6A clearly visualizes the dual counter-propagating hollow conical beams where the focal points overlap each other. FIG. 6B shows an aggregate from *Bacillus subtilis* (BG) spore, absorbing, irregularly shaped, ~30 μm was trapped at the foci; FIG. 6C shows the dual counter-propagating hollow conical beams with a large offset (Δd>1 mm) between the two focal points. FIG. 6D shows transparent glass spheres (8 μm in diameter) trapped at each of the focal points.

A number of different types of dry particles, spherical or non-spherical, absorbing or non-absorbing (transparent), in size range from one to a few tens microns were tested using the aforementioned optical trap built by the inventors. The optical trap is capable of trapping both transparent and absorbing particles with arbitrary morphology. The tested particles were silica glass microspheres (Cospheric, n=1.46); NIST-traceable borosilicate glass microspheres Duke Scientific, n=1.56); NIST-traceable polystyrene microspheres (Thermo Scientific, n=1.59); Johnson grass spores (Greer, n~1.55); volcanic ash collected from Eyjafjallajökull in Iceland (n~1.4-1.6); *Bacillus subtilis* (BG) spores (n~1.55); Ragweed pollen (Geer); Fly ash (Particle information service, Inc.); Ground Ammonium sulfate (Sigma); Ground sugar (sucrose); and Arizona road dust (Powder Tech., Inc.). All particles were easily caught and trapped with high trapping efficiency (e.g., >50%) and strong trapping robustness. Testing showed that particles with size in diameter 1, 2, 5, 8, 10, 11, 20, and ~30 μm were stably trapped.

Through experiments, the inventors found that the trapping efficiency is very sensitive to the alignment of the two foci. A small axial displacement either positive (more effective) or negative helped particle trapping. The axial displacement ΔD (e.g., of a few microns) is more favourable for trapping a larger particle (e.g., >5 μm). Once the dual-beam trapping was in an optimized alignment, which is defined as a perfect overlap of the two optical axes of the reflectors with no radial displacement (ΔR=0 μm), there was almost always a particle being trapped once particles were dusted into the trapping area. However, the trapping efficiency dropped dramatically once the alignment of the two optical axes was off (ΔR≠0).

As had been stated above, in order to trap and hold arriving transparent particles with high trapping efficiency, an optical trap should be able to successively catch and trap at least 20% of the particles from continuously sampling. An "average trapping efficiency" may be defined as a ratio of a successful trapping event over the number of attempts. Using the optical trap built and tested by the inventors, the average trapping efficiency was found to reach higher than 50% for transparent particles (2-10 μm). This is about 10 times higher than the conventional single hollow beam trapping scheme using a relatively low N.A. (~0.55) optical focusing. The average trapping efficiency for trapping absorbing particles was found to be nearly 100%.

Based on the aspects of simplicity, robustness, flexibility, and efficiency, which have been used to evaluate the optical trapping quality and performance of the different optical-trapping schemes, this novel optical trap design holds all the advantages of simplicity, flexibility, and high trapping efficiency. In order to quantitatively analyze the trapping robustness as defined, a series of small amount of disturbing air was puffed into the chamber to test how robust the trapping was. The robustness was roughly estimated by gradually increasing the strength and puffing frequency of the air turbulence to check how far the particle could be pushed away and still be drawn back to the original position and stably trapped by the restoring force. In one test, a particle was stably trapped initially, then started to vibrate by a relatively weak air disturbance, then pushed away a few tens micron by the increasing disturbance but was still able to return back to its trapping position. Comparing with the other optical configurations using single hollow beam trapping, or dual-beam trapping using focused Gaussian beams with low N.A. optics this dual-beam trapping arrangement greatly increased the trapping robustness to be very strong.

In embodiments, the two parabolic reflectors 31, 32, create dual counter-propagating hollow conical beams from a single collimated hollow beam, without using any other optics as otherwise needed in typical dual-beam trapping setups for forming two beams. The two parabolic reflectors were selected as the focusing optics, not only because they achieve a large N.A., but also can focus the beam far away from surfaces of all optical components (e.g., ≥6.5 mm in this configuration) to minimize the possible sample contamination of the optics. By contrast, the working distance for high N.A. microscopic objective (e.g., >0.95) is only a few microns.

As shown in the embodiment depicted in FIG. 1, the first reflector 31 may provide a first upwardly propagating conical beam, and the second reflector 32 may provide a second downwardly propagating conical beam. This upward and downward counter-propagating arrangement takes the advantage of the strong scattering force along the optical axis of the reflectors to balance the gravitational force, increasing the axial trapping robustness yet supplying low power trapping that benefits especially for studying live biological samples. Meanwhile, introducing particles along the optical or normal axis line of the beams (such as through opening 45) greatly increases the contact cross-section for catching particles to the conical beam(s), which significantly improved the particle trapping efficiency. As the particle is trapped far away from the optical surfaces (or at a longer working distance), the trap offers sufficient space and flexibility to be integrated with other laser spectroscopic techniques, such as Raman spectroscopy, for on-line trapping-enabled particle characterization.

The optical trapping described herein is capable to trap both transparent and absorbing particles with arbitrary morphology. The inner and outer parts of the single hollow beam, are reflected, respectively, by the parabolic reflectors to form two counter-propagating (e.g., upward and downward) hollow conical beams and focus to discrete focal points in the trapping region 40. The usage of a single light beam LB enables relatively simple alignment and without the usage of optics for forming dual-beams, while it holds the advantages of dual-beam trapping with high efficiency and strong robustness. A vertical arrangement also allowed to introduce particles along the hollow focusing cone to increase the particle capturing rate. The parabolic reflectors are also able to supply a large N.A. focusing while trapping particles at a far distance to minimize sample contamination, and importantly to enable easy integration with other optical characterization spectroscopic techniques. Numerical simulations confirms the design of the optical arrangement and better understand the trapping force field that is particularly advantageous for highly efficient trapping of transparent particles in air. Experimental results demonstrated a good agreement with the simulations and support the following conclusions:

Large N.A. optics and dual-beam trapping do help trapping particles in air (particularly transparent particles).

A few microns displacement ($\Delta D \neq 0$) between the two foci of the up- and downwards propagating hollow conical beams produces larger trapping force than perfectly overlapped ($\Delta D=0$), for relatively large particles.

A good alignment between the two foci in radial direction ($\Delta R=0$) is very critical for stable trapping.

Single beam trapping (only with the lower reflector) is very operative for trapping relatively low refractive index particles (n~1.1-1.5, as laser tweezers used in liquid). However, dual-beam trapping works better for larger refractive index particles (more suitable for trapping airborne particles generally with n~1.1-2.0), particularly at a small displacement.

In view of the foregoing, embodiments of the innovative optical trap may be used for various applications. For example, it may be used in a laboratory for in-vitro inspection and/or measurement of trapping particles. Or it may be incorporated into other airborne handling systems.

Figure 7:
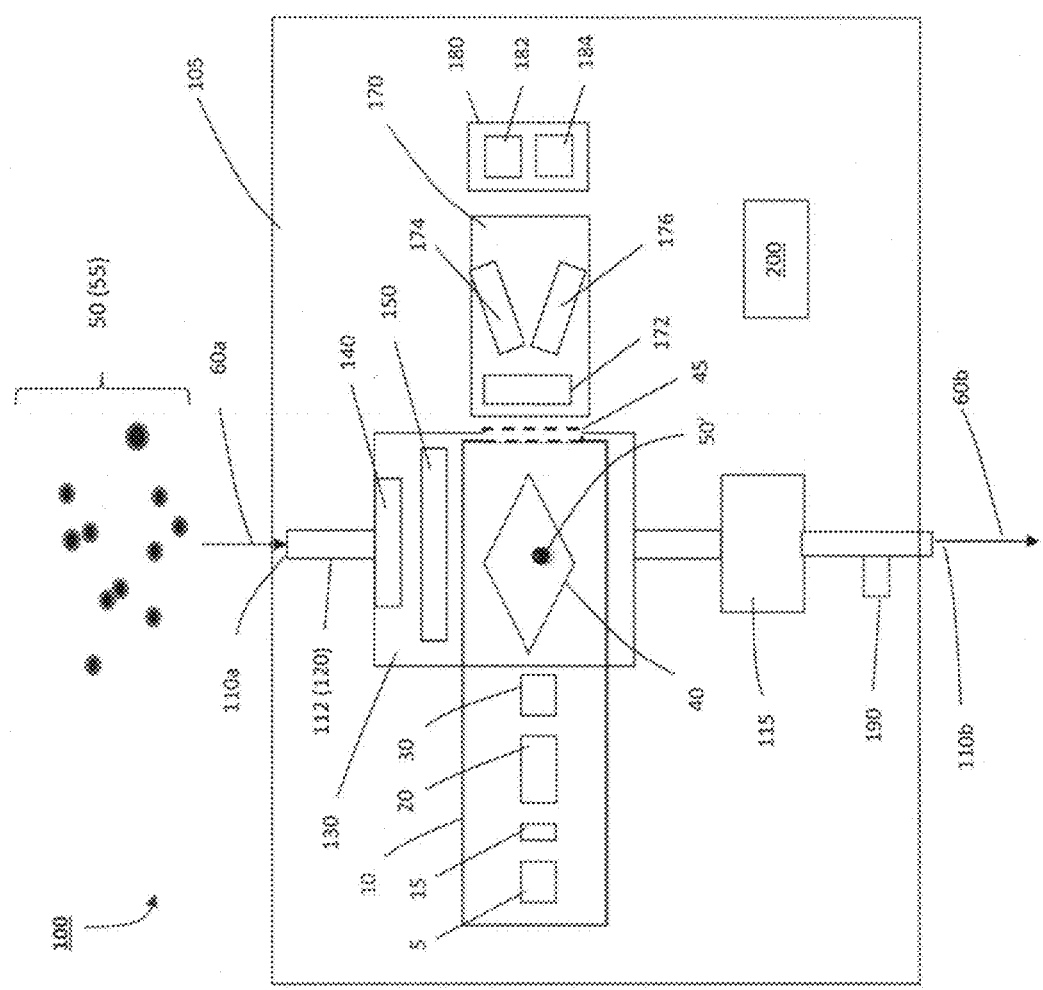
FIG. 7 is a schematic illustration of an example system for continuously sampling airborne particles according to an embodiment of the present invention.

FIG. 7 shows a schematic illustration of an example system 100 for continuously sampling airborne particles according to an embodiment of the present invention. Various elements of the system 100 may be incorporated into a housing or other structure 105, thus forming a unitary apparatus. The housing 105 may also include an appropriate power supply, for instance. As such, the system, embodied as an apparatus, may provide a compact and portable device. Not all elements illustrated in the figure will be provided, and/or other elements may be provided in other embodiments. Additionally, it will be appreciated that the elements may be present or may be positioned in locations other than illustrated in this schematic.

Once inside the system 100, particles 50 can be trapped and held using the optical particle trap 10 for inspection and/or measurements. The system 100 includes an airflow system 120 configured to draw one or more airborne particles 50 into a measurement volume 130. Inside the sampling volume 130 there is the trapping region 40. Particles within this trapping region 40 can be trapped and held for measuring, as explained later. The trapping region 40 may be defined by a glass containment cell.

The optical trap 10 is located within a sampling volume 130 of the system 100. For instance, in one embodiment, the sampling volume 130 and the trapping region 40 may be substantially the same size and overlap in a location within the system. In other embodiments, the trapping region 40 could be made relatively large and the sampling volume could be made small, and the air could be directed toward the optical trap 10. That arrangement may increase the fraction of particles, drawn into the device, that are caught in the trap, which can be beneficial for situations where the particles have been pre-selected in some way, or are expensive or hard to obtain.

Other measurements of properties (such as temperature, humidity, density, etc.) of the air drawn into the sampling volume 130, and/or of airborne particles 50 drawn into the sampling volume 130, and/or of the flow rate of the air drawn into the sampling volume 130 may be measured. Additional measurement(s) of particles 50, not requiring trapping individual particles 50', may also be measured in the sampling volume 130. Other configurations of the sampling volume 130 are also possible.

Particles 50 may be suspended in a gaseous medium 55, typically atmospheric air, or some other gas. In various implementations and uses, the particles may include, e.g., solid, liquid, gel, and/or mixtures of these dispersed in a gas, which may be consistent with the usual and customary definitions of aerosol particles. The system may be configured so that all the particles 50 drawn into the system pass through the trapping region 40, or it may be configured so that only a fraction of the particles are drawn through the trapping region 40. While a particle 40 is held in the trapping region 40 of the optical trap 10, airflow may continue substantially unabated through the trap 10, around the trap 10, or some combination thereof.

The airflow system 120 creates a flow of air 60. The incoming airflow 60a (to the system 100) flows into an inlet 110a and then to the sampling volume 130. The outgoing airflow 60b (from the system 100) flows via an outlet 110b to the ambient environment. A filter and/or grating (not shown) may be provided at the inlet 110a, if desired, to prevent particles larger than a predetermined size from entering the system. Passage 112 may provide fluid connection for airflow 60 through the system 100. A fluid mover 115 may be provided which creates sufficient force (e.g., negative pressure) to move the airflow 60 into and through the system 100. For example, the fluid mover 115 may be a pump, a fan, a compressor, a blower, a corona-generated ion wind, etc. To avoid violent or turbulent flow, the fluid mover 115 may be operated to ensure the flow rate of airflow 60 is laminar with a steady flow rate. To avoid large drag forces on particles, the airflow rates will typically be less than 1 m/s, and may be less than 1 cm/s. Lower airflow and particle velocities allow particles to be trapped with lower requirements for trapping laser power, for a given trap design. However, when the airflow rates are decreased, in order to reduce the requirements for trapping (such as, the trapping laser intensity), the sampling rate tends to decrease. While the fluid mover 115 is illustrated near the outlet 110b of the system 100, as it is a preferred embodiment because the particles do not need to pass through any fluid mover before they are measured. But, it will be appreciated that the fluid mover 115 can be located at another location in the airflow 50, such as, for example, near inlet 110a.

Inside the sampling volume 130, air and particles may pass through an optional particle concentrator 140 which increases the concentration or density of the particles in the airflow 60. The particle concentrator 140 may be a so-called "air-to-air" concentrator, for instance, for specifically processing particles in a gaseous medium.

A particle detector 150 is configured to detect a particle (or particles) approaching and/or within the sample volume 130. In one embodiment, the particle detector 150 may include one or more trigger beams. When a particle scatters light from the beam or beams, and this light is detected by one or more photodetectors, the signals from the photodetector or photodetectors indicate the presence of a particle either approaching and/or within the trapping region 40, depending upon the precise alignment of the trigger. As shown, the particle detector 150 is positioned somewhere upstream of the trapping region 40. But, in other embodiments, trigger beams of the particle detector 150 could overlap with the sampling volume 130 and/or the trapping region 40. For example, the particle detector 150 may be comprised of two different-wavelength crossed-beam diode lasers with corresponding photodetectors, each of said photodetectors including an optical filter that passes the wavelength of the diode laser it detects and blocks the light from the other diode laser and light at any other wavelengths that would interfere. One crossed diode trigger laser system which may be used as a particle detector 150 is described, for example, in U.S. Pat. No. 6,947,134, herein incorporated by reference. Of course, other trigger beam systems and devices might also be used for detection a particle. For detection of a particle within (not approaching) the trapping region, the particle detector 150 could at least partially overlap the trapping region 40 in the schematic drawing. Detector 150 also can be used to determine particle speed and size as an example.

The optical trap 10 generates and uses dual counter-propagating hollow conical beams to trap and hold absorbing and non-absorbing, spherical and irregularly shaped, liquid and solid airborne particles. A beam of light is generated by the light source 5 are shaped by optics in the beam shaping region 15. Next, the hollow beam is formed by optics in the hollow beam forming region 20. And the dual counter-propagating hollow conical beams are formed in region 30 and focused into the trapping region 40. Particle trapping occurs at and/or between the focal points of the hollow conical beams in the region 40. The window 45 enables inspection and/or measurement into the trapping region 40. No mirror is shown here, but the optional mirror 25 could be positioned in the beam path as shown in FIG. 1 in some embodiments.

The optical trap 10 may operate as follows: 1) the light source 5 is gated off (or turned "off", or modulated to a relatively low intensity, or blocked) for a short time (e.g., 1 ms) to let any trapped particle (typically as soon as the measurement of the trapped particle is completed) out of the trapping region 40, and to let new particles into the trapping region 40; 2) the trapping light source 5 is gated on (or turned "on", or modulated to be at a higher intensity) to trap any particle that is in the trapping region 40. After completion of the measurement(s), the process may be repeated, and in a typical embodiment is repeated continuously as soon as a particle is trapped and its desired properties have been measured. This approach may provide a less expensive, system by eliminating the separate trigger lasers and their associated photodetectors, filters, lenses and holders for this subsystem. The laser can also remain on at all times to trap one or a few representative particles for study and measurement, similar to the operating mode used in most conventional laser tweezer systems.

Optical forces generated by the optical trap 10 will tend to urge the particle 50' toward a focal point of the focused beam in the trapping region 40 of the optical trap 10; thus, the volume in which the particle is held during measurement of it optical properties is typically much smaller than the trapping region 40. Ideally, the trapping region 40 is sized and configured to trap and hold one individual particle 50' at a time from the airflow 60. It is noted that this is the expected performance of the optical trap 10.

However, there may be circumstances (e.g., relatively high concentrations of particles 50 in the inlet air) in which more than one particle might be trapped and held. This is a result of the typical substantially random distribution of particles in air. But the probability of trapping and holding two or more particles (e.g. greater than 0.5 micrometer) at once is likely to be very low (e.g., less than 1% of the time) if the average concentration of particles in air is low enough that only one particle is in the trapping region at any time. For instance, the particle concentration could be diluted by combining the inlet air with clean air, without any concentrator 140, at low inlet flow rate, or even by enclosing the inlet airflow within a clean air sheath. In any event, the optical trap 10 can be configured to trap and hold about one particle for measurement(s) thereof (i.e., where the vast majority of the measurements are of a single individual particle, and only some small fraction of the measurements are of two or more particles with sizes greater than some minimum diameter, e.g., 0.6 micrometer).

For some applications, embodiments that measure average spectra for multiple particles may be adequate, and in fact desired, for example, because the measurements could be made more quickly. For example, in monitoring the smoke particles from a fire, or the exhaust from an engine, trapping many particles at once, can provide a way to rapidly provide the average spectra of the particles, which may be desirable because, for example, such particles may change rapidly as the engine or fire parameters vary.

The trapping light source 5 is actuated (i.e., turned-on) or unblocked (or gated-on) or modulated to a higher intensity, for example, at an appropriate time to trap a particle. Various methods may be used to control the laser beam LB that generates the optical trap 10. If the light source 5 is a diode laser that can be controlled by varying its drive current, then the beam amplitude (and trap) can be controlled by varying the drive current. And if the laser is one where the amplitude cannot be directly controlled sufficiently rapidly using fast electronics then other modulators or shutters could be used. For example, a separate blocking or modulating element (not shown) may be provided in various embodiments. This blocking or modulating element may be configured to be actuated so as to block the laser beam from reaching the trapping region 40. The blocking element could include, for instance, an acousto-optic modulator (AOM), electro-optic modulator (EOM), a motor-driven mechanical shutter, or a piezoelectric-driven shutter.

While a particle 50' is trapped and held in the optical trap 10, one or more properties of that trapped particle 50' may be measured or otherwise made. A measurement device 170 thus is configured to measure at least one property of the trapped particle 50' while it is held in the optical particle trap 10. These measurements may include, for example, Raman, fluorescence, thermal emission, laser-induced breakdown spectroscopy (LIBS), spark-induced breakdown spectroscopy (SIBS), image, particle morphology, elastic scattering over one, a few or many angles or wavelengths. The Raman, fluorescence, thermal emission, LIBS and SIBS may each be measured at one or more emission bands, including the case of sufficient bands to be considered a spectrum. The measurement device 170 include at least one source for illumining and/or exciting emission of trapped particles. The foregoing list is not exhaustive and other measurement techniques may be used. Devices for performing such measurements are generally known and will not be described in greater detail.

In one or more embodiments, Raman spectra (or Raman emission in one to several bands) of a trapped particle may be measured. Raman spectra provide information on the vibrational and rotational energy levels of molecules. These spectra can serve as "fingerprints" for various pure materials such as chemical warfare (CW) agent droplets, and may serve as fingerprints for some complex particles such as biological warfare (BW) aerosols prepared in certain ways, or certain species of fungal spores, etc. For these more complex particles such as those made from bacteria, the spectra tend to become more difficult to differentiate from spectra of similar bacteria grown under various conditions. More particularly, Raman spectral measurements may include, for example, Raman scattering, Raman spectroscopy, Resonance Raman spectroscopy, Coherent anti-stokes Raman scattering (CARS), and surface enhanced Raman scattering (SERS), which could be measured, for example, if the particles are combined with a droplet containing colloidal silver or gold nanoparticles before measurement).

Raman spectra may provide more information regarding the chemical and/or biochemical composition of individual airborne particles than can be obtained using ultraviolet laser-induced fluorescence (UV-LIF) even when the UV-LIF is combined with elastic scattering. According to one embodiment, the system may measure Raman spectra of particles at rates of 10's per minute to a few per second, depending upon the particle sizes, absorption coefficients, Raman cross sections, and concentrations of particles in air, etc. In general, Raman emission is generated when excitation electromagnetic energy (light) interacts with the molecules in a material. This excitation light generates a spectrum of light that has a different (e.g., typically longer) wavelength than the wavelength of the excitation light. The Raman emission spectra are usually characteristic of the material and generally exhibit peaks at wavelengths which depend upon the excitation wavelength and the frequencies of vibration and rotation of the molecules in the material.

At least one detector 172 may be included in the measurement device 170 for particle measurements. Typically in operation, only a fraction of the particles entering the system may be measured (although such operation is not limiting). The detector 172 can vary depending on which property of the trapped particle 50' is to be measured. General detectors and/or specific detectors may be used, for instance. In some embodiments, the detector 172 may include a spectrograph and the sensors.

Depending on the measurement desired, an excitation source may be required generate energy which can produce emissions and/or another phenomenon by the trapped particle 50'. In some embodiments, the same light source (e.g., laser) 5 that is used to trap the particle 50' may also be used to generate the excitation energy which causes the trapped particle 50' to generate the emissions and/or another phenomenon which is to be detected by the detector 172. For example, a portion of the beam of light source 5 may be split off from the rest of the beam (e.g., with a mirror, beamsplitter and/or other optics), manipulated and directed via optics to the trapped particle 50'.

In other embodiments, increased flexibility in trapping and measuring can be obtained by using one or more separate excitation sources 174. These sources, such as a laser, may be provided in the measuring device 170 that are configured to excite emissions of the trapped particle. As such, the trapping light source 5 need not be used in the measuring process. The excitation sources 174 may be operated at a different wavelength and/or other parameters than the trapping light source 5. For example, in some embodiments, the excitation sources may be focused tightly or weakly, depending on the application or mode of operation.

Collection optics 176 may further be included for manipulating emission and/or phenomenon to be measured by detector 172. These optics generally include some signal collection optics such as a lens, an objective, an elliptical mirror and a spherical mirror, and can use the same optics that form the trap. As an example of the elliptical mirror, the aerosol particle will be trapped at one of the focal points of the elliptical mirror, which has been positioned to coincide with the center of the spherical mirror. Therefore, light that reaches the spherical mirror from the particle is reflected back to the center of the mirror and towards the elliptical mirror, while light that reaches the elliptical mirror either directly from the particle or reflected from the spherical mirror is reflected to the second focal point of the elliptical mirror. This second focal point overlaps with the entrance of the spectrometer. This configuration enables collection of a large solid angle (e.g., greater than $2\pi$ or even $3\pi$ sr) of the Raman spectral emission from single particles, and it focuses the emission into a small angle to match the f-number of the Raman spectrometer.

A particle analyzer 180 is configured to analyze the measurement data. More particularly, the analyzer 180 may rapidly identify, determine, classify, characterize and/or sort, particles according to their measured properties. In some embodiments, it may determine, from at least one measured property, a parameter related to the trapped particle 50'. This may include determining from the measurements one or more parameters related to particle shape, size, refractive index, absorption, Raman cross section or any combination thereof of the trapped particle, for example. Parameters may be determined or otherwise computed from measured data. For instance, extracting the size, shape and refractive index of a particle from angular scattering measurements requires solving an inverse problem, or at least finding an approximation to that solution.

The particle analyzer 180 may be configured to monitor measurement data for potentially harmful particles such as bacteria, bacterial spores, pollens, fungal spores, protein allergens, smoke particles, and pollutants, such as pollutant particles that contain polycyclic aromatic hydrocarbons or reactive oxygenated species. A database (not shown) of known threats may be searched and/or analyzed with respect to measurement data, for example. Also, past measurements may be stored for further analysis and/or future searching.

In some instances, the particle analyzer 180 may be used to count and classify particles which can be used to determine or estimate exposures of persons to various airborne chemicals and pollutants, such as, for example, smoke from fires or burn-pits, or to diesel exhaust. The particle analyzer 180 may be a computer or microprocessor, for instance, which is configured to execute an algorithm 182 that is used to identify and or classify particles based on their measured properties, preferably in real time. The different categories can correspond to one or more different pollens, bacteria, bacterial spores, allergens or any other classification scheme. In some embodiments, the near-real-time algorithm used to classify particles into categories will be similar to those described in papers by R. G. Pinnick et al, "Fluorescence spectra of atmospheric aerosol at Adelphi, Md., USA: measurement and classification of single particles containing organic carbon," Atmos. Environ., 38, 657-1672 (2004); and by Y. L. Pan et al, "Single-particle laser-induced fluorescence spectra of biological and other organic-carbon aerosols in the atmosphere: measurements at New Haven, Conn., and Las Cruces, N. Mex.," J. Geophys. Res., 112, D24S19, 1-15 (2007), each of which is herein incorporated by reference. In other embodiments the near-real-time algorithm used to sort particles into categories may be the one described by Y. L. Pan et al, "Fluorescence spectra of atmospheric aerosol particles measured using one or two excitation wavelengths: Comparison of classification schemes employing different emission and scattering results," Optics Express, 18(12), 12436-12457 (2010), herein incorporated by reference. Of course, for the case of Raman spectra the algorithms may be the same or similar, but the actual spectral shapes for the different particle categories are very different, and generally will have higher information content. Again, for the case of thermal emission the algorithms may be the same as or similar to those described above, but the actual spectral shapes and spectral features that are used in the algorithms are different.

Additionally, the particle analyzer 180 may be coupled to a warning detector 184 that is configured to provide a warning when particles consistent with expected or known biological or chemical agents are detected. This may be instrumental, for instance, in the case of an attack with aerosolized biowarfare or chemical warfare agents by indicating a potential attack, so that personnel can begin to take protective actions. The warning detector 184 may include an audible alarm or siren, flashing (strobe) light, display screen, etc. which can provide audible and/or visual warnings. In some instances, written instructions may be provided by the display screen or printer for the aid of personnel. If the system is connected to a network (e.g., phone, internet, intranet, etc.) it may generate messages to contact first responders or other emergency personnel, command personnel and/or other persons, as desired.

A particle sorter 190 can physically sort, and optionally store, particles based on their measured properties. One particle sorting system which may be used with embodiments of the present invention is disclosed, for example, in U.S. Pat. No. 7,410,063, herein incorporated by reference. In other embodiments, once it is determined that a trapped particle should be collected and stored for further analysis, the air surrounding the particle is drawn though a filter (e.g., glass fiber, or filter with small holes (e.g., a nucleopore, or Millipore filter) by opening a valve connected to a vacuum or by turning on an air pump, and then catching the particle on the filter as the air it is entrained in is drawn through the filter.

A controller 200 is provided which is configured to the various control operations of the system 100, preferably in a fully-automated manner so that the system can trap a particle from air, hold it for as long as needed to measure its Raman spectrum or other properties as appropriate, then release the particle once the measurement(s) are completed, and then continuously repeat these steps (trap, measure, release). The controller 200 may be a computer or microprocessor, for instance, that includes computer-executable code which when executed is configured to implement methods for continuously sampling particles from air.

The controller 200 may be configured to generate and send signals to the various elements described herein, for instance, causing the elements to function or be otherwise actuated/deactivated upon command. This may include generating signals to: trap a particle in the sampling volume and hold the trapped particle; measure a property of the trapped particle; and release the trapped particle. The aforementioned sequence may be repeated as many times as desired.

Operation of the system 100 may vary depending on the particle detector 150, as discussed above. For example, in one embodiment, the controller 200 may generate a signal to actuate the optical trap 10 to trap the particle in the sampling volume 130 based on a detection signal received from the particle detector 150. Or, in another embodiment, the controller 200 may generate a signal to cause the measuring device 170 to measure a property of a trapped particle 50' already trapped in the optical trap 10 based on a detection signal received from the particle detector 150.

Once a particle is trapped by the optical trap 10, depending on the desired operation, controller 200 may ensure that it is held for sufficient time in order to: a) make one or more measurements of the same particle using different techniques; b) make improved measurements because the particle location can be better defined; and c) make measurements of dynamic processes in a trapped particle, by repeatedly measuring the spectrum or other parameter to see how it changes with time. In one embodiment, the fluorescence spectra can be measured with higher resolution, and the angular optical scattering can be measured with far better knowledge of the position of the particle and of the angles of the measured scattering intensities. The resulting reduction in uncertainties in the measurements makes the inverse problem, to extract parameters relating to the shape, size or chemical composition, far more tractable. Other sampling methodologies may also be executed, and the aforementioned ones should not be thought of as exhaustive.

Aspects of this invention have been previously disclosed in the following paper: Yong-Le Pan, Aimable Kalume, Isaac C. D. Lenton, Timo A. Nieminen, Alex B. Stilgoe, Halina Rubinsztein-Dunlop, Leonid A. Beresnev, Chuji Wang, and Joshua L. Santarpia, "Optical-trapping of particles in air using parabolic reflectors and a hollow laser beam," Opt. Express 27, 33061-33069 (2019), herein incorporated by reference in its entirety for all purposes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. An optical trap for trapping and holding both absorbing and non-absorbing, spherical and irregularly shaped, liquid and solid airborne particles comprising:
   a light source for generating a beam of light;
   optics for shaping and forming a hollow conical beam having a ring geometry from the beam of light;
   a trapping region where a particle can be present to be trapped;
   a first parabolic reflector configured to focus an inner portion of the hollow conical beam to a first focal point in the trapping region; and
   a second parabolic reflector configured to focus an outer portion of the hollow conical beam to a second focal point in the trapping region.

2. The optical trap of claim 1, wherein one or more particles are trapped (i) at the first focal point; (ii) at the second focal point; (iii) at both the first and second focal points where there is a separation distance there between; (iv) at a position where the first and second focal points coincide; and/or (v) between the first and second focal points.

3. The optical trap of claim 1, wherein there is an adjustable distance between the first and second focal points of the first and second parabolic reflectors.

4. The optical trap of claim 3, further comprising: a first stage to move the first parabolic reflector in the trapping region to change the position of the first focal point; and/or a second stage to move the second parabolic reflector in the trapping region to change the position of the second focal point.

5. The optical trap of claim 1, wherein the first parabolic reflector receives light of the inner portion of the hollow conical beam from the bottom and focuses the light upward towards the first focal point, and the second parabolic reflector receives light of the outer portion of the hollow conical beam from the bottom and focuses the light downward towards the second focal point.

6. The optical trap of claim 1, wherein the first and second parabolic reflectors have numerical apertures (N.A.) of at least 0.55.

7. The optical trap of claim 1, wherein the light source comprises a laser, a light emitting diode (LED), or other light source with a narrow wavelength band or a broad wavelength band either in continuous wave (CW) or pulsed format.

8. The optical trap of claim 1, wherein the optics comprise: a pair of axicon lenses, spatial light modulators (SLM), phase and amplitude mask, biaxial crystals, diffraction pattern, optical components configured to produce an aberration, and/or an interference pattern of coherent light source using a single or multiple laser or light beams to produce the hollow conical beam.

9. The optical trap of claim 1, wherein the optics comprise: a pair of lens with different focal lengths, which are used to controlling the thickness of the hollow conical beam.

10. The optical trap of claim 1, further comprising a mirror positioned between the optics and the first and second parabolic reflectors for changing the direction of the hollow conical beam.

11. The optical trap of claim 1, wherein the hollow conical beam having the ring geometry includes an annular region with a central opening or void of substantially no intensity.

12. The optical trap of claim 1, wherein particles are introduced into the trapping region through an opening in a central portion of the second parabolic reflector not otherwise used for focusing.

13. The optical trap of claim 1, further comprising: a controller configured to control the trapping and holding of particles, wherein the controller is configured to generate signals to:
deliver one or more airborne particles to the trapping region;
trap one or more airborne particles in the trapping region;
measure one or more properties of the one or more trapped airborne particles; and
release the one or more trapped airborne particles.

14. A particle detection and measuring system comprising:
the optical trap of claim 1 for trapping and holding both absorbing and non-absorbing, spherical or non-spherical, solid or liquid airborne particles;
a particle detector configured to detect an airborne particle approaching and/or within the trapping region of the optical trap; and
a measurement device to measure at least one property of the trapped particle.

15. The system of claim 14, wherein the optical trap is configured to trap and hold only about one particle at any one time.

16. The system of claim 14, further comprising: at least one source configured to illuminate and/or excite the trapped one or more airborne particles.

17. The system of claim 14, wherein the measurement device is configured to measure one or more of: imaging, Raman spectra, Raman emission in one or more wavelength bands, laser-induced breakdown emission in one or more wavelength bands, laser-induced breakdown spectra, spark-induced breakdown emission in one or more wavelength bands, spark-induced breakdown spectra, fluorescence in one or more wavelength bands, fluorescence spectra, multi-photon excited fluorescence, thermal emission at one or more wavelengths, thermal emission spectra, or light scattering over one or more angles, light scattering at multiple wavelengths, absorption spectra of the particle, particle size and shape.

18. The system of claim 14, wherein the optical trap has an average trapping efficiency of at least 20% of the particles from continuously sampling.

19. A method for continuously sampling particles from air using the particle detection and measuring system of claim 14, the method comprising:
delivering air including airborne particles toward a trapping region;
detecting an airborne particle in the air approaching and/or within the trapping region;
trapping one or more airborne particles in the optical trap;
measuring a property of the trapped one or more airborne particles; and
releasing the trapped one or more airborne particles.

20. The method of claim 19, further comprising: determining from the measured property a parameter related to particle shape, size, refractive index, absorption, molecular structures and compositions, chemical reactions, or any combination thereof of the trapped one or more airborne particles.

* * * * *